Patented Sept. 1, 1931

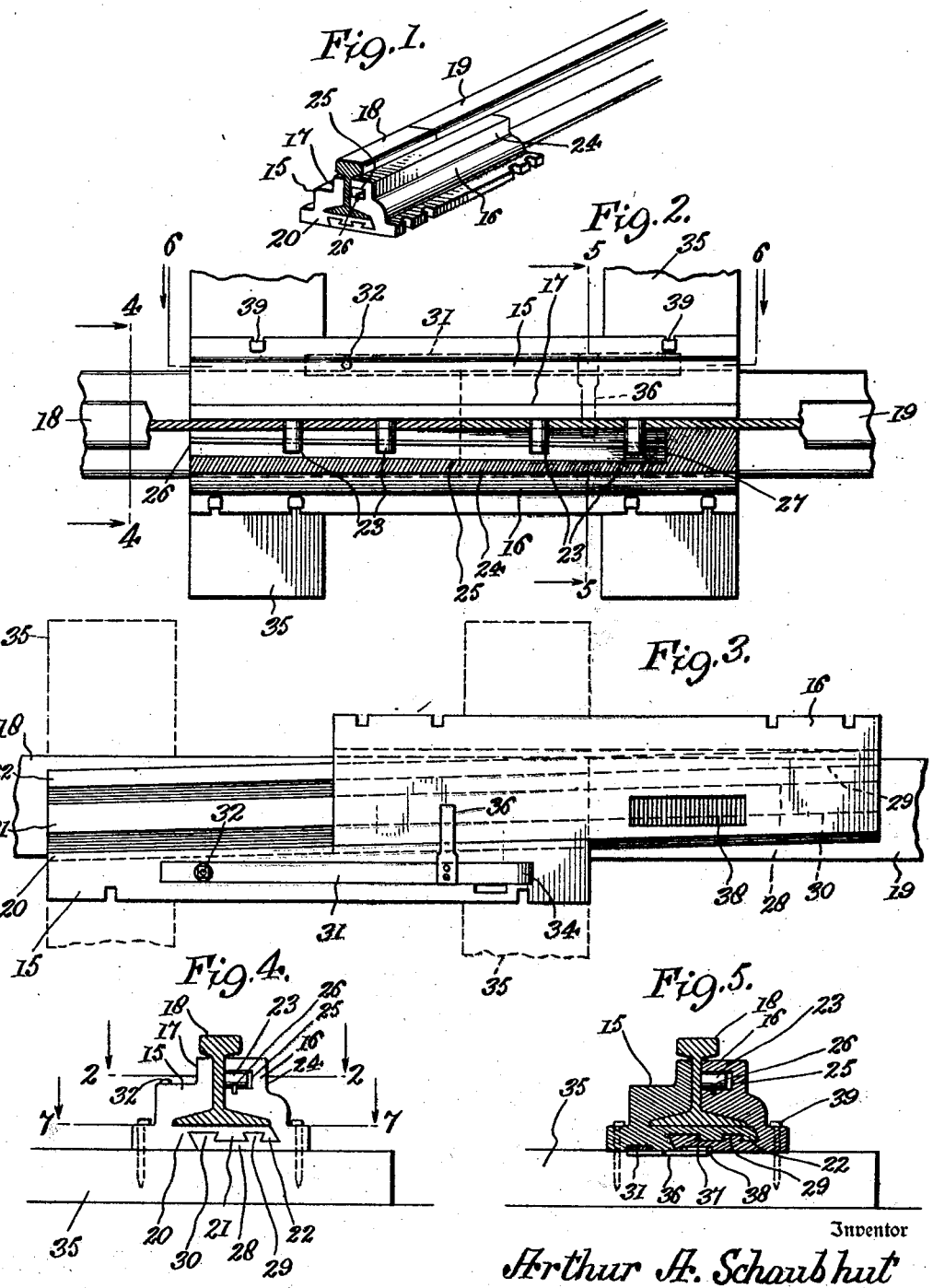

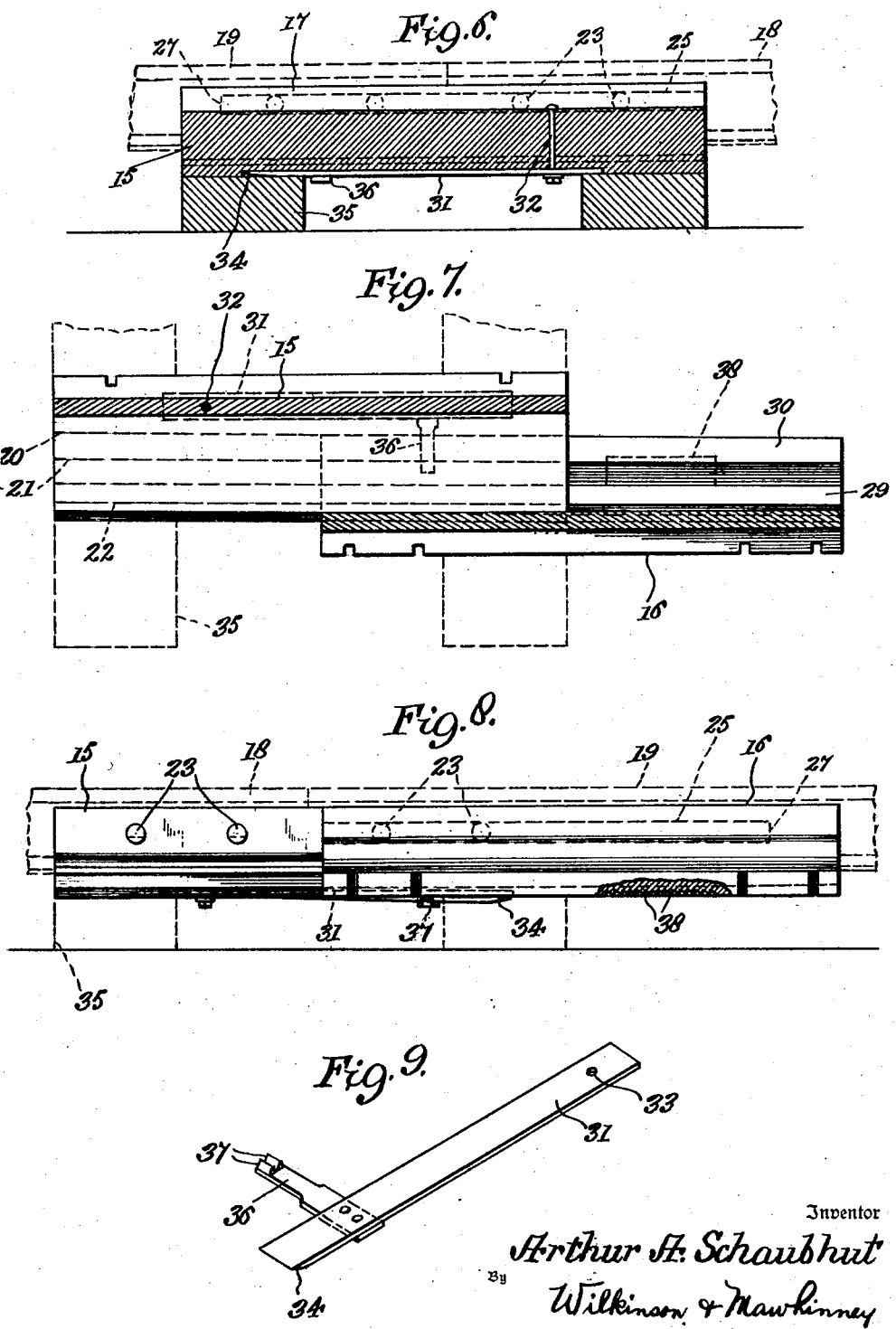

1,821,325

UNITED STATES PATENT OFFICE

ARTHUR A. SCHAUBHUT, OF THIBODAUX, LOUISIANA, ASSIGNOR OF ONE-FIFTEENTH TO LAWRENCE H. PUGH, OF THIBODAUX, LOUISIANA

RAIL COUPLING

Application filed August 25, 1930, Serial No. 477,716. Renewed July 24, 1931.

The present invention relates to railways, and more particularly an improved coupling adapted for use in securing the adjacent ends of rails of a track together.

An object of the present invention is to provide a coupling of a character which may be used for securing the adjacent ends of rails together without the use of bolts, or the like, and which is adapted to replace the present type of coupling, wherein independent fish plates are used and held in place by nuts and bolts.

Among the various other objects of the invention are that the improved coupling secures the rails in place more firmly and thoroughly than the present type of coupling which uses bolts; that the improved type of coupling is relatively economical as compared with prior types manufactured and used; that the use of the present coupling will greatly decrease and prevent accidents upon railroads arising from defective couplings; that the present coupling will render it more difficult to tamper with and destroy the couplings, as compared with the present type of coupling with its fish plates and bolts; and that the present improved coupling may be quickly and completely adjusted in the laying and replacement of rails, and thus save considerable time and money.

With the foregoing and other objects in view, the invention will be more fully described hereinafter, and will be more particularly pointed out in the claims appended hereto.

In the drawings, wherein like symbols refer to like or corresponding parts throughout the several views, Figure 1 is a perspective view of the rail coupling constructed according to the present invention, and as applied to the meeting ends of rails, one of the rails being shown in section.

Figure 2 is a horizontal section, enlarged, taken through the same substantially on the line 2—2 of Figure 4, and showing the coupling in locked position.

Figure 3 is a bottom plan view of a coupling as applied to the rail ends and in an initial position.

Figure 4 is a transverse section taken through one of the rails adjacent one end of the coupling, substantially on the line 4—4 of Figure 2.

Figure 5 is a transverse section taken through the coupling as applied to the rails, substantially on the line 5—5 of Figure 2.

Figure 6 is a longitudinal vertical section taken through the coupling on substantially the line 6—6 of Figure 2, the rails being shown in dotted lines.

Figure 7 is an enlarged transverse section taken on the line 7—7 of Figure 4, with the rails removed and showing the coupling members in partly assembled relation.

Figure 8 is a side elevation of the same, partly broken away to show the rack teeth in the bottom of one of the sections, and Figure 9 is a detail perspective view of the locking latch employed.

Referring now to the drawings, the coupling comprises a pair of opposed interfitting members 15 and 16. The member 15 is provided with an upstanding web 17 adapted to lie against one side of the meeting ends of adjacent rails, such as 18 and 19, as shown particularly in Figure 1. The web 17 is of substantially the height of the web of the rails, but with sufficient clearance at its upper end beneath the ball of the rail to take care of expansion and contraction. From the lower portion of the web 17, the member 15 extends outwardly over the bases of the rails 18 and 19 at said side thereof and terminates in an inwardly extending base flange 20, which extends substantially across the underside of the bases of the rails in contact therewith, and which has upon its lower surface dovetail tongues 21, and 22 spaced apart transversely of the flange 20 for a purpose which will hereinafter appear.

The web 17 of the member 15 is also provided at its inner side and at suitably spaced apart points lengthwise of the web 17 with a desired number of transverse pins 23 adapted to enter the usual bolt holes formed in the webs of the rails 18 and 19 for anchoring the rails in end to end engagement and between the members 15 and 16. The pins 23 project through the webs of the rails and to a considerable distance beyond the same, as shown particularly in Figures 4 and 5.

The opposite member 16 is of somewhat similar construction, and has an upright flange 24 adapted to lie against the opposite side of the webs of the rails 18 and 19, and which is provided in its inner face and opening against the webs of the rails 18 and 19 with a longitudinal slot 25 of suitable width and depth to receive therein the projecting ends of the pins 23. A locking key 26 is seated in the bottom of the groove or slot 25 intermediate the sides of the groove and which is adapted to slidably engage in recesses or grooves formed in the lower sides of the pins 23 for holding the latter from pulling out of the groove 25 after the member 16 has been moved lengthwise into position. The groove 25 opens through one end of the member 16, as is clearly shown in Figures 2 and 4, so that the member 16 is introduced into position by endwise movement with the open end of the groove 25 foremost, and in line with the row of pins 23 to consecutively receive the latter and slide the same along the key 26 into locked position. It will be noted from Figure 2 that the groove 25 terminates at its inner end in a shoulder 27 adapted to abut against the innermost pin 23 and serve as a stop to limit the sliding movement of the member 16 when being closed. From Figure 2, it will be noted that the inner wall of the groove 25 and the locking key 26 are inclined to the vertical central plane of the coupling so as to recede inwardly from the webs of the rails 18 and 19, so as to draw in and accommodate the pins 23 as the locking member 16 of the coupling is slid into place.

The member 16, like the member 15, extends outwardly and downwardly from the lower end of the flange 24, and is seated upon the side of the rail bases and is provided with an inwardly extending flange 28 adapted to lie against the underside of and slidably fit upon the lower flange 20 of the opposite member 15. The flange 28 has on its upper side dovetail tongues 29 and 30, which are spaced apart transversely of the flange 28 and adapted to interfit and interlock with tongues 21 and 22 of the flange 20. It will be noted that the tongues 21, 22 and the tongues 29 and 30 are so disposed with respect to their respective members 15 and 16 as to present inclined bearing surfaces adapted to draw the members 15 and 16 into tight or binding relation against the opposite sides of the rails 18 and 19 as the members 15 and 16 are moved lengthwise with respect to each other in the closing of the coupling.

Means is provided for releasably interlocking the members 15 and 16 in desired closed relation to one another, and for this purpose, one of the members, such as the member 15, is provided with a latch shown in detail in Figure 9 and which comprises a spring bar 31 countersunk longitudinally in the bottom of the member 15 and secured at one end thereto by a bolt 32, a rivet or other suitable fastening device which engages through an opening 33 in the end of the spring bar 31 for normally holding the bar in its countersink. The free end of the bar 31 is preferably bevelled, as at 34, and at its outer face, so as to prevent the free end of the bar 31 from catching in obstructions beneath the coupling, such as in the upper faces of ties 35, or the like.

The bar 31 is further provided near its free end portion with a toothed dog 36 in the form of a bar which is relatively short and riveted or otherwise secured to the spring bar 31, and which at its free end is provided with one or more relatively broad teeth 37 which register with rack teeth 38 disposed in countersunk relation and lengthwise of the flange 28 of the member 16. The spring arm 31 thus normally urges the dog upwardly to interlock the teeth 37 and 38 when the members are brought into the desired closed position.

The coupling members 15 and 16 are adapted to be anchored to the ties 35 and in relative interlocking engagement by means of spikes 39, or the like, usually employed, for securing fish plates and rail joints in position.

In operation and use, it is only necessary to bring the ends of the rails 18 and 19 together in desired end to end relation, and to then press the member 15 against one side of the rail ends, and with the pins 23 projecting through the bolt openings in the webs of the rails. The member 16 is now slid endwise with the open end of the groove 25 foremost, and with the tongues 21 and 22 interlocking with the tongues 29 and 30. The member 16 is now moved longitudinally, so as to cause the pins 23 to enter the groove 25 and slide over the locking key 26. During this movement, the members 15 and 16 are drawn closer together and against the opposite sides of the rail ends by the inclined or web shaped surfaces of the interlocking tongues beneath the bases of the rails and the inclined key 26.

When the members 15 and 16 have been driven together with this wedging action, until the desired tight fit is obtained, the spring bar 31 engages its dog with the teeth 38 and thus holds the members 15 and 16 from moving backwardly into the releasing position, so that the coupling is rigidly held against loosening incident to vibration, or the like. Furthermore, the spikes 39 are driven into the ties 35 and extend through the slots or recesses in the outer edge portions of the members 15 and 16 to further insure that these members will not creep backwardly out of adjusted position. The latch member, however, holds the members from longitudinal sliding movement and thus relieves the ties and spikes against the strain and vibration which would otherwise be imparted to them incident to the passage of the rolling stock over the rails.

It is apparent that incident to wear or strain, between the parts of the coupling and the rails ends, when it is desired to take up the loose play between the parts, it is only necessary to release the spikes 39, and to then pry the free end of the spring bar 31 downwardly an extent sufficient for releasing the teeth 37 from the teeth 38 when the member 16 may be moved for disengaging or loosening the same. To tighten the members, the member 16 may be driven further into binding engagement when the teeth 37 will automatically move over the ratchet teeth 38 and thus hold the parts in their newly adjusted position. From Figure 8, it will be noted that the teeth 38 are inclined outwardly or in such direction as to hold the teeth 37 against accidental retrograde movement, so that the members cannot be released merely by impact or pressure toward an open position.

It will be obvious that many changes in the construction, combination and arrangement of parts could be made, which could be used without departing from the spirit of my invention, and I do not mean to limit the invention to such details, except as particularly pointed out in the claims.

Having thus described my invention, what I claim and desire to secure by Letters Patent of the United States is:—

1. A rail coupling comprising a pair of members for engagement against the opposite sides of the meeting ends of rails, one of said members having an upstanding flange to lie against the webs of the rails and provided thereon with pins adapted to engage the bolt holes of the webs of the rails and having at its lower portion an inwardly extending flange adapted to project beneath the bases of the rails and having inclined dove tail tongues on the under face of said flange, said other member having an upstanding flange adapted to lie against the opposite side of the webs of the rails and having a longitudinal groove opening through one end of the member only, and opening throughout its length through the inner side of said flange for slidably receiving the ends of said pins therein upon the longitudinal shifting of the second member toward the first member, means carried by the second member in said groove adapted to engage said pins entering the groove, said second member also having an inturned flange adapted to lie beneath the base of the rails and said first flange and having on its upperside inclined dove tail tongues for interlocking engagement with the tongues of the first flange, a spring bar carried by the second member in the underside thereof, and having at its free end a laterally extending dog overlapping the underside of said first flange and having upwardly extending teeth and a rack on said first flange in line with said dog for interlocking engagement with the teeth thereof to hold the members in relative adjustment.

2. A rail coupling comprising a pair of members having overlapping inturned flanges for engagement beneath the bases of rail ends, and provided on the flanges with interlocking tongues for drawing the members together against the opposite sides of the rails upon the relative longitudinal shifting of the members, pins carried by one member engaging through the webs of the rails, the other member having interlocking means for engaging the pins upon the relative longitudinal shifting of the members, a spring bar seated lengthwise in the bottom of one of the members and having a toothed dog near its outer end and ratchet teeth arranged longitudinally in the bottom of the other member and in line with the teeth of said dog for interlocking the members when adjusted.

ARTHUR A. SCHAUBHUT.